United States Patent Office 3,546,586
Patented Dec. 8, 1970

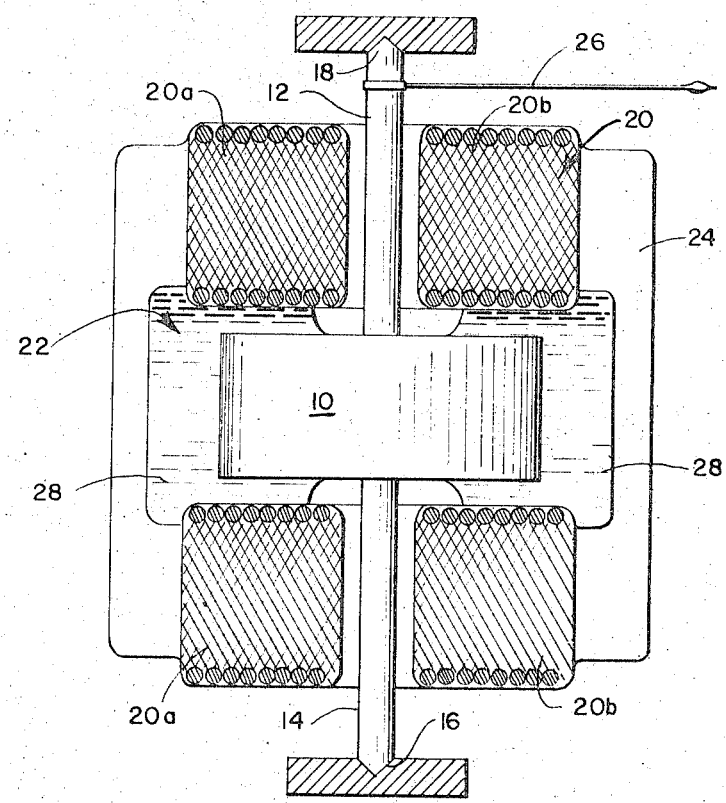

3,546,586
METER MOVEMENT UTILIZING MAGNETIC FLUID FOR DAMPING
Allen G. Stimson and Donald G. Cameron, Rochester, N.Y., assignors to Eastman Kodak Company, Rochester, N.Y., a corporation of New Jersey
Filed July 17, 1968, Ser. No. 745,449
Int. Cl. G01r 1/14, 1/16
U.S. Cl. 324—125                                   6 Claims

ABSTRACT OF THE DISCLOSURE

Damping for a meter movement such as a galvanometer is provided by a magnetic fluid held in the gap of the movement by a permanent magnetic field.

BACKGROUND OF THE INVENTION

Field of the invention

The present invention relates to fluid damping arrangements for meter movements such as galvanometers.

The prior art

The problem of providing damping for meter movements of instruments such as moving-coil or moving-magnet galvanometers is one of long standing. The precision bearings provided for such instruments are substantially free from friction. Thus where a current or voltage is suddenly applied to the terminals of the instrument, the indicating needle thereof will tend to overshoot the scale value corresponding to the applied current or voltage. Without the provision of some form of damping, the needle will oscillate about the corresponding scale value for some time before finally coming to rest. The use of fluid damping such as is provided by dash pot arrangements or the like is one well known approach to the problem of bringing an indicating needle in such an instrument quickly to rest. One disadvantage in the use of fluid damping is that the fluid utilized may leak out of whatever container is provided therefor and might cause damage to the meter movement. Further, fluid damping arrangements are in many cases cumbersome and relatively expensive.

SUMMARY OF THE INVENTION

In accordance with the present invention fluid damping for a meter movement is provided by a magnetic fluid positioned in a gap in the movement and held there by a permanent magnetic field.

In accordance with one presently preferred embodiment of the invention, damping is provided by a magnetic fluid positioned in what ordinarily would be an air gap between the magnet and the coil of an instrument in which gap the two normally move with respect to each other. The magnetic fluid is held in position by the magnetic field set up by the permanent magnet and the magnetic force thus exerted on the fluid prevents leakage thereof from the air gap. The magnetic fluid may comprise a colloidal suspension of very fine ferromagnetic particles in an organic carrier. The fluid is paramagnetic and will be attracted by the poles of the moving magnet and will thus be retained in the air gap. In addition to providing effective damping of the moving magnet the presence of the magnetic fluid in the air gap prevents accumulation of dirt or other foreign matter in this area.

Other features and advantages of the present invention not specifically enumerated will become apparent upon considering the description of the invention set forth hereinbelow.

BRIEF DESCRIPTION OF THE DRAWING

The single figure of the drawing is a schematic representation of a portion of a meter movement provided with magnetic fluid damping in accordance with the invention.

DESCRIPTION OF THE PREFERRED EMBODIMENT

Referring to the drawing, there is schematically illustrated the basic operating mechanism of a moving-magnet type instrument such as a moving-magnet galvanometer. It will be understood that the present invention is not limited to use in such an instrument and may in fact be incorporated into any similar instrument utilizing a permanent magnetic field. The moving-magnet galvanometer is similar to the somewhat more common D'Arsonval moving-coil galvanometer except that, as the name implies, the magnet rather than the coil is the movable element. It is to be understood that the invention is also applicable to D'Arsonval type instruments.

A moving permanent magnet 10 is rotatably mounted by a pair of outwardly extending elongate pivot members or pins 12 and 14 which are correspondingly received in first and second bearing recesses 16 and 18. It will be understood that the bearing arrangement provided for moving magnet 10 may be of any conventional construction and may, for example, comprise a conventional jewel-type bearing. Moving magnet 10 is positioned within an open space between portions of an electromagnetic coil 20. Coil 20 and magnet 10 are arranged such that an air gap 22 exists therebetween. Electromagnetic coil 20 is wound on an insulating coil frame 24; coil sections 20a and 20b are connected in series to the source of electrical current which is to be measured. With current flowing in coil 20 the coil acts as an electromagnet in accordance with well-known principles and develops two magnetic poles which attract or repel the magnetic poles of the moving magnet 10. Because the poles of moving magnet 10 attempt to align themselves with the magnetic poles of the electromagnetic coil 20, moving magnet 10 will be rotated an amount depending upon the amplitude of the current in coil 20. Thus an indicating pointer 26 attached to pivot member 12 will provide an indication of the current in coil 20. Indicating needle 26 cooperates with an associated scale (not shown) to provide a visual indication of this current value.

As stated hereinbefore, because of the substantially friction-free bearing arrangements provided for instruments of this type, indicating needle 26 will tend to overshoot the appropriate scale value upon the application of a current to the meter terminals. In accordance with the present invention damping of the movement of magnet 10 is effected through the provision of a magnetic damping fluid 28 located in the air gap 22 between the magnet 10 and the coil 20. Fluid 28 tends to rapidly damp out any oscillatory motion of magnet 10. Thus moving magnet 10 and, correspondingly, indicating needle 26, come quickly to rest in a position determined by the torque resulting from the current in coil 20. Magnetic fluid 28 is held in the air gap 22 by the attractive forces set up by the magnetic poles of the permanent magnet 10 and these forces prevent the fluid 28 from flowing out of the gap 22.

The magnetic fluid 28 includes a colloidal suspension of very fine ferromagnetic particles in an organic carrier which may, for example, be kerosene. The characteristics of such a fluid are such that the application of a magnetic field, for example, that supplied by moving magnet 10, will exert a force on the fluid without changing its characteristics as a "fluid." The ferromagnetic particles cause fluid 28 to be paramagnetic, and thus different portions of the fluid will be differently magnetized by the poles of the permanent magnet 10. These different portions of the fluid 28 will rotate with moving magnet 10 to provide damping therefor. Further, as noted above, it is through the mechanism of the attraction of the magnetic fluid 28 to magnet 10 that fluid 28 is retained in gap 22.

It is noted that the attractive van der Waal forces between the particles themselves may, in many instances, make it necessary to add a dispersion agent such as oleic acid to the carrier to ensure that the separation of the particles is such that the van der Waal forces therebetween remain relatively weak. The dispersion agent may be a monomolecular layer absorbed on the surface of each particle which, upon the approach of another particle, provides an elastic repulsion to oppose the attractive forces which would otherwise cause flocculation, i.e., collection of the particles into small masses, with the resultant settling out thereof. For a further discussion of the magnetic fluids themselves reference is made to the article "Magnetic Fluids," by R. E. Rosenswieg, appearing at pages 48 to 56 of the July 1966, issue of International Science and Technology, together with the further works listed in the bibliography of said article at page 90.

As pointed out hereinbefore, fluid 28, in addition to providing damping, also prevents the accumulation of dirt or other foreign matter in air gap 22.

The invention has been described in detail with particular reference to the preferred embodiment thereof, but it will be understood that variations and modifications can be effected within the spirit and scope of the invention.

I claim:
1. In a galvanometer having a permanent magnet providing a magnetic field and an electromagnetic coil, the magnet and the coil being separated by a gap and mounted for relative movement with respect to each other, the improvement comprising a magnetic fluid in the gap for damping relative movement with respect to the magnet and the coil, said fluid including a colloidal suspension of ferromagnetic particles in a carrier liquid, said fluid being retained in the gap by the magnetic field.

2. The improvement claimed in claim 1 wherein the magnet is mounted for movement relative to the coil, so that movement of the magnet is damped by said fluid.

3. The improvement claimed in claim 1 wherein said particles are very fine, and wherein said liquid includes kerosene.

4. The improvement claimed in claim 1 wherein said liquid includes a dispersing agent to avoid flocculation of said particles.

5. The improvement claimed in claim 4 wherein said agent includes oleic acid.

6. In a galvanometer having a permanent magnet providing a magnetic field and an electromagnetic coil, the magnet and the coil being separated by a gap, the magnet being mounted for movement relative to the coil, the improvement comprising a magnetic fluid in the gap for damping movement of the magnet, said fluid including a colloidal suspension of very fine ferromagnetic particles in a carrier liquid, said liquid including kerosene and a dispersing agent to avoid flocculation of said particles, said agent including oleic acid, said fluid being retained in the gap by the magnetic field.

References Cited

UNITED STATES PATENTS

| 2,492,273 | 12/1949 | DeGiers et al. | 324—125X |
| 2,685,947 | 8/1954 | Votrian | 188—90X |
| 3,366,903 | 1/1968 | Searle et al. | 324—152X |

RUDOLPH V. ROLINEC, Primary Examiner

E. F. KARLSEN, Assistant Examiner

U.S. Cl. X.R.

73—430; 324—151